US011884785B2

(12) United States Patent
Lin et al.

(10) Patent No.: US 11,884,785 B2
(45) Date of Patent: Jan. 30, 2024

(54) BIO-BASED ELASTOMER COMPOSITION AND FILM AND LAMINATE PREPARED THEREFROM

(71) Applicant: FOSHAN KING WONDER HI-TECH CO., LTD., Guangdong (CN)

(72) Inventors: Yuwei Lin, Guangdong (CN); Yaogen Wu, Guangdong (CN); Donghui Zeng, Guangdong (CN); ZhiJian Yan, Guangdong (CN); Yingbo Xu, Guangdong (CN); Qiang Qi, Guangdong (CN)

(73) Assignee: FOSHAN KING WONDER HI-TECH CO., LTD., Guangdong (CN)

( * ) Notice: Subject to any disclaimer, the term of this patent is extended or adjusted under 35 U.S.C. 154(b) by 142 days.

(21) Appl. No.: 17/432,666

(22) PCT Filed: Dec. 19, 2019

(86) PCT No.: PCT/CN2019/126658
§ 371 (c)(1),
(2) Date: Aug. 20, 2021

(87) PCT Pub. No.: WO2020/173191
PCT Pub. Date: Sep. 3, 2020

(65) Prior Publication Data

US 2022/0169806 A1 Jun. 2, 2022

(30) Foreign Application Priority Data

Feb. 25, 2019 (CN) ......................... 201910137382.5

(51) Int. Cl.

*C08J 5/18* (2006.01)
*B32B 7/14* (2006.01)
*B32B 25/08* (2006.01)
*C08L 101/00* (2006.01)

(52) U.S. Cl.

CPC .................. *C08J 5/18* (2013.01); *B32B 7/14* (2013.01); *B32B 25/08* (2013.01); *C08L 101/00* (2013.01); *B32B 2250/02* (2013.01); *B32B 2264/10* (2013.01); *B32B 2264/303* (2020.08); *B32B 2270/00* (2013.01); *B32B 2307/546* (2013.01); *B32B 2307/726* (2013.01); *B32B 2307/732* (2013.01); *C08J 2300/26* (2013.01); *C08J 2400/22* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 2004/0176523 A1* | 9/2004 | Weiss | C08K 3/22 | 524/497 |
| 2004/0225066 A1 | 11/2004 | Flat et al. | | |
| 2008/0103217 A1* | 5/2008 | Sunkara | C08K 5/0083 | 516/53 |
| 2013/0177747 A1* | 7/2013 | Lin | B32B 5/026 | 156/324 |

FOREIGN PATENT DOCUMENTS

| | | |
|---|---|---|
| CN | 1032220 C | 7/1996 |
| CN | 1278839 | 1/2001 |
| CN | 101346228 | 1/2009 |
| CN | 101767465 | 7/2010 |
| CN | 103192567 | 7/2013 |
| CN | 103747955 | 4/2014 |
| CN | 105693992 | 6/2016 |
| CN | 107556715 | 1/2018 |
| CN | 109897370 | 6/2019 |
| EP | 0378015 B2 | 7/2000 |

OTHER PUBLICATIONS

International Search Report and Written Opinion of PCT/CN2019/126658, dated Mar. 19, 2020, 13 pages including English translation of the International Search Report.

* cited by examiner

*Primary Examiner* — Ramsey Zacharia
(74) *Attorney, Agent, or Firm* — Hamre, Schumann, Mueller & Larson, P.C.

(57) ABSTRACT

The present invention discloses a composition for preparing bio-based elastomer film with high moisture permeability, and a bio-based elastomer film and a laminate therefrom, wherein the composition comprises: 5%-95% bio-based elastomer material, 0-80% resin polymer, 0.01-90% inorganic powder material having a particle size within 100 μm and/or organic low molecular material having a molecular weight within 2000 Daltons, and 0-10% organic anti-blocking agent (dispersant). The bio-based elastomer film and laminate of the present invention have excellent moisture permeability and mechanical performance, which can be widely used in various fields including outdoor sporting goods, clothing, medical treatment, food packaging and shoe materials, and which are environmentally friendly and green products.

10 Claims, 1 Drawing Sheet

BIO-BASED ELASTOMER COMPOSITION AND FILM AND LAMINATE PREPARED THEREFROM

FIELD OF THE INVENTION

The present invention relates to a composition for preparing a bio-based elastomer film, and a film and a laminate prepared therefrom. More specifically, the present invention relates to a composition for preparing bio-based elastomer film with high moisture permeability, and a bio-based elastomer film and a laminate prepared therefrom.

BACKGROUND OF THE INVENTION

Nearly 99 percent of the polymer materials come from petrochemical resources, which will one day face a crisis of depletion, and environmental problems will become increasingly serious. In this context, it is of urgent practical significance to study and develop bio-based polymer materials to replace petroleum-based polymer materials.

Bio-based thermoplastic material is the product to respond to the demand for replacing or decreasing non-renewable petroleum energy. Its raw material includes castor oil, rapeseed oil, etc. After chemical refining, a polymer is obtained, which comprises basically polyester, nylon, polyether, polyurethane and other components. The present researches mainly focused on basic performance and molecular structure design of polyurethane system and polyester system with less studies on bio-based elastomer and even more less studies on elastomer formula with moisture permeable function. The research on bio-based elastomer is usually on its synthesis with almost blank on its film and its laminate, which hinders the understanding and application of bio-based products. The people in the art believed the bio-based elastomer are non-moisture permeable with hard feeling.

CN 107556715 A discloses a waterproof moisture permeable film and its preparation method in which hydrophilic modified polyester resin (80-120 parts) is mixed with a modified microporous cellulose powder so that macro-molecules polymer in the waterproof moisture permeable film can be more likely to degrade into a polymer with low molecular weight and the waterproof moisture permeable film can be better biodegradable with meeting the physical and chemical needs of textile and clothing.

CN 105693992 A discloses a bio-based waterproof moisture permeable thermoplastic polyurethane resin and its preparation method, which uses 20%-100% bio-based diol to synthesize polyurethane resin, believing that the resulting polyurethane resin has special properties of waterproof, moisture permeability, and good air permeability and can be applied in outdoor clothing and other equipment. However, for small molecules of diol, whether they are from petrochemical or biological resources, their performance does not differ much.

CN 1032220 C discloses a water vapor permeable thermoplastic film with polyetheramide as its main component in which the moisture permeability and mechanical strength of the product are improved. CN 1278839 discloses the preparing method of the polyetheramide and its products. CN 101346228 discloses a waterproof, vapor permeable multi-layer film which comprises at least one first layer and one second layer, where all of the layers are made from thermoplastic polymers selected from polyether esters, polytheramides or polyether carbamate and connected to each other.

In the art the bio-based waterproof and moisture permeable film usually has polyester and polyurethane, while non-biomass materials is applied in the waterproof and moisture permeable film with polyetheramide as well as its laminate.

Polyamide (nylon) has non-toxic, light weight, excellent mechanical strength, wear resistance and good corrosion resistance, so it has been widely used. However, for waterproof and moisture-permeable films, conventional petroleum-based nylon elastomer is still used in the art.

Therefore, it is necessary to provide a waterproof and moisture permeable film which is made from bio-based nylon elastomer to replace the traditional petroleum-based nylon elastomer, and the prepared film will be beneficial to the environment, recycled for granulation, and degraded rapidly in which the non-renewable petroleum resources will be saved.

SUMMARY OF THE INVENTION

The object of the present invention is to provide a composition for preparing a bio-based elastomer film with high moisture permeability and to provide a film and a laminate prepared therefrom.

For one aspect, in order to achieve the above object the present invention provides a composition for preparing a bio-based elastomer film with high moisture permeability, based on the overall weight of the composition, the composition comprising 5%-95% bio-based elastomer material,
0-80% resin polymer,
0.01-90% inorganic powder material having a particle size within 100 μm and/or organic low molecular material having a molecular weight within 2000 Daltons, and
0-10% organic dispersant.

In the above composition of the present invention, the bio-based elastomer is preferably a bio-based nylon elastomer resin material, derivative or mixture thereof in which the bio-based nylon elastomer can be 1-100%, preferably 1-95%, more preferably 10-80%. The mixture here can also include a recycled bio-based elastomer or a recycled bio-based nylon elastomer film of the present invention.

In the above composition of the present invention, the polymer resin can be any polymer, derivatives thereof and any combination thereof. Preferably it is one or more polymer selected from the group consisting of polyether, polyolefin, polyurethane, nylon, polyethylene terephthalate, polybutylene terephthalate, polyether ester and their derivatives. The proportion of the polymer resin is preferably 0-75%, more preferably 0-70% of the composition of the present invention. The polymer resin can also include a secondary recycled polymer resin or a recycled bio-based elastomer film of the present invention.

In the composition of the present invention, inorganic powder material can be various inorganic powder or various inorganic powder combinations. For example, the inorganic powder material can be one or more inorganic powder selected from the group consisting of titanium dioxide, silicon dioxide, montmorillonite, various inorganic pigments, calcium carbonate, barium sulfate white, ceramic powder and magnesium hydroxide. Among them, the inorganic pigments can be one pigment or a combination of various pigments with optional proportion, and ceramic powder can be aluminum oxide, preferably nano-particles which can reflect infrared ray or emit negative ions. The particle size of inorganic powder is preferably 0.1-30 μm, more preferably 0.1-20 μm, and further preferably within 10 μm. The amount of inorganic powder in the composition is preferably 5-75% and more preferably 10-59%.

In the composition of the present invention, the molecular weight of an organic low molecular material is preferably lower than 2000 and more preferably lower than 1000. It can be one or more photo-thermal stabilizer and one or more substances selected from the group consisting of antioxidants, dyes, chain extender, and aromatic. Among them, photo-thermal stabilizers include benzophenones, benzoxazinones, benzoxazoles, benzotriazoles, and their combination. Antioxide is one or more substances selected from the group consisting of pentaerythritol diphosphate ester antioxides, triazine antioxides, ester antioxides, hindered benzoate antioxides, hindered amine antioxides, hindered phenolic antioxides, triketone antioxides, phosphite antioxides, thioester antioxides and its derivatives. The chain extender can be one or more selected from the group consisting of polyols and their derivatives, polyfunctional organic low molecules with active epoxy group and their derivatives, and polyfunctional organic low molecules of maleic anhydride and their derivatives, in which the number of functional groups is 2-10. The added amount of the organic low molecular material is preferably 5-75% and more preferably 10-59%.

In the present invention, inorganic powder material and organic low molecular material can be mixed together or used separately, preferably mixed together, with any optional proportion, preferably 40:1-1:1.

In the composition of the present invention, the organic dispersant is preferably one or more organic material selected from the group consisting of paraffin, fatty acid, aliphatic amide, ester, metal soap, low molecular wax, etc. More preferably it is one or more selected from the group consisting of fatty acid, aliphatic amide, ester, and low molecular wax. The proportion of the organic dispersant is preferably 0.1%-4%, and more preferably 0.4%-3%.

As a specific Example of the present invention, the composition for preparing a bio-based elastomer film with high moisture permeability can comprise 5%-90% bio-based elastomer resin material, 0.1-45% inorganic powder material and/or organic low molecular material, and 0.1-4% dispersant.

As another specific Example of the present invention, the composition for preparing a bio-based elastomer film with high moisture permeability can comprise 8%-95% bio-based nylon elastomer resin material, 1-70% polymer resin, 0-45% inorganic powder material and/or organic low molecular material, and 0.1-4% dispersant.

As further another specific Example of the present invention, the composition of preparing a bio-based elastomer film with high moisture permeability can comprise 35%-95% bio-based nylon elastomer resin materials, 1-50% polymer resin, 10-45% inorganic powder material and/or organic low molecular material, and 0.4-3% dispersant.

Preferably, the above composition for a bio-based elastomer film with high moisture permeability is formed into particles. For example, the added components is blended and granulated. Preferably, the bought bio-based elastomer raw material is granulated and modified by reaction. For example, when blending polyolefin with maleic anhydride (reaction agent) and elastomer is added.

As another aspect, in order to achieve the above object the present invention also provides a bio-based elastomer film prepared from the above composition with a thickness of 1-500 μm, preferably 2-150 μm, more preferably 2-50 μm, much more preferably 2-30 μm, and most preferably 2-25 μm. Tested by the JIS L1099 B1 method, the moisture permeability of the film can be above 100,000 $g/m^2$*24 h, preferably above 120,000 $g/m^2$*24 h, more preferably above 150,000 $g/m^2$*24 h. And in the case of super moisture permeability it should be above 160,000 $g/m^2$*24 h.

In the present invention, the moisture permeability is related to the formula and thickness of the film. The more the non-permeable the bio-based nylon elastomer, the more the non-permeable polymer resin, the less the moisture permeability. And the more the inorganic powder, the less the moisture permeability. The thinner the thickness of the film, the higher the moisture permeability.

In the present invention, the above composition can be mechanically mixed, melt granulated or directly squeezed into a membrane with a double or single screw, according to different formulation. For the formula with only organic low molecular material, it is preferred to allow direct extrusion into the film, and for the formula with only inorganic powder material it is preferred to apply premixed melt granulation.

For example, the mixture of the composition of the present invention is granulated by a granulation machine and the obtained particles is formed into a plastic film through a tape casting process in which the cast screw temperature is about 110-300° C. with a single screw or a combination of screws.

In the present invention, a multi-layer co-extrusion or a single-layer extrusion device can be used. When the co-extrusion is applied the composition in different layers should be uniform. It is preferably to apply the multi-layer co-extrusion or single-layer extrusion with single screw, and a 1-3 layer extrusion is more preferable.

In the present invention, the melting processing temperature can be 160-300° C., preferably 160-270° C., and it can be adjusted according to the formula. If it is a formula with inorganic powder material, the temperature is preferably 190-260° C., and if it is a formula with only organic low molecular material, the temperature is preferably 170-230° C.

In the present invention, various operating steps include intermediate special process, side cutting, bundling, slitting, etc., preferably any step combined or separately. The intermediate special process can be any one or combination of the following operating: surface processing, cleaning with solvent, printing, online ripening, coating or gluing. Preferably the intermediate special process can be surface processing, printing, sizing, and/or online ripening. The surface processing method can be online or offline, preferably online, including stamping paint, patterning, matte molding, etc. Sizing is mainly used to apply coating, glue, etc., based on the specific requirements. Various online ripening methods can be chosen, preferably matched with the production speed, as described in CN 101767465 A.

In the present invention, the intermediate special process will change the performance of the product, especially in terms of moisture permeability, appearance, strength, hand feeling, toughness, etc.

The present invention invents a film made from a bio-based nylon elastomer, which belongs to a green product as it is environmentally friendly and can be automatically degraded into carbon dioxide and water in specific environment or condition.

The present invention invents a waterproof moisture permeable film prepared by a bio-based nylon elastomer with remarkable moisture permeability and the same mechanical performance as that of a conventional film.

The film product of the invention can be matte, high transparent, transparent with color, translucent with color or matte with color. Its light transmittance (ASTM D1003-2007) can be 0.01-100%, which is preferably chosen based on the film appearance and thickness. For example, the transmittance for a transparent film is preferably 50%-95%, for a film with masked color preferably 20%-100%, for a matte film preferably 30%-100%.

The proportion of the bio-based component(s) (ASTM D6866-2016) in the present invention can be 1-100%, more preferably 1-95%, most preferably 10-80%. The higher the proportion of the bio-based component(s), the lower the moisture permeability of the film, but it is not critical factor.

The breaking elongation (ASTM D828) of the film of the present invention can be greater than 300% with a preferable value of above 350%, which is related to the toughness of the film. The higher the proportion of inorganic powder material in the composition, the lower the breaking elongation. The more uniform the dispersion of the dispersant, the higher the breaking elongation. The chain extender will increase the cross-linking of the components in the composition and thus increase the toughness of the film when its proportion is in a certain range, but on the contrary when beyond such a range the toughness of the film will decrease.

As still another aspect, in order to achieve the above object the present invention further provides a laminate of a thermoplastic resin film, wherein the laminate comprising at least one layer of the above bio-based elastomer film, at least one layer of thermoplastic resin product, and an adhesive layer formed by a glue which is located between said layer of the bio-based elastomer film and said layer of the thermoplastic resin product, wherein said layer of thermoplastic resin product is a thermoplastic resin film or a thermoplastic resin fiber product, which is textile fiber and/or non-woven fabric (non-spunbond non-woven fabric or material containing spunbond non-woven fabric).

Preferably, the aforementioned bio-based elastomer film is a bio-based nylon elastomer film.

When preparing the laminate of the present invention, the bio-based nylon elastomer film is prepared by screw melt extruding of mixed particles and cooling. Then the prepared film is combined with the layer of thermoplastic resin product through a discontinuous adhesive layer.

In the above laminate of the present invention, one or more layers of textile fibers can be one or more fibers selected from the group consisting of polyether ester and its derivatives, polyester and its derivatives, nylon and its derivatives, polyurethane and its derivatives, polypropylene and its derivatives, and any combination thereof. One or more layers of non-woven fabric can be selected from the group consisting of non-woven fabric of polyolefin and its derivatives, non-woven fabric of polyester and its derivatives, non-woven fabric of nylon and its derivatives, and non-woven fabric of biodegradable plant fiber and its derivatives, preferably polypropylene non-woven, polyester non-woven, and non-woven of biodegradable plant fiber and its derivatives.

Preferably, in the laminate of the present invention, the adhesive layer is a discontinuous layer, more preferably a discontinuous dot layer, a spaced strip layer, or a grid-like layer, to increase the air permeability and moisture permeability of the laminate.

Preferably, the laminate of the present invention has a moisture permeability of 25,000 $g/m^2$*24 h or more (JIS L1099 B1 method), more preferably 30,000 $g/m^2$*24 h or more, and further preferably between 30,000-80,000 $g/m^2$*24 h.

In the laminate of the present invention, the grain weight of the fiber product can be 1-500 $g/m^2$ and the gram weight of the adhesive layer preferably above 0.1 $g/m^2$.

The film and laminate prepared by the bio-based nylon thermoplastic elastomer composition of the present invention have excellent moisture permeability and mechanical performance and can be widely used in various fields including outdoor sporting goods, clothing, medical treatment, food packaging, shoe materials and so on.

The present invention is further described in details with reference to the accompanying drawings and embodiments. The embodiments described below are just for the purpose of understanding the present invention, and they could not be construed as a limitation of the present invention in any way.

DRAWINGS

DESCRIPTION OF THE PREFERRED EMBODIMENTS

Figure 2:
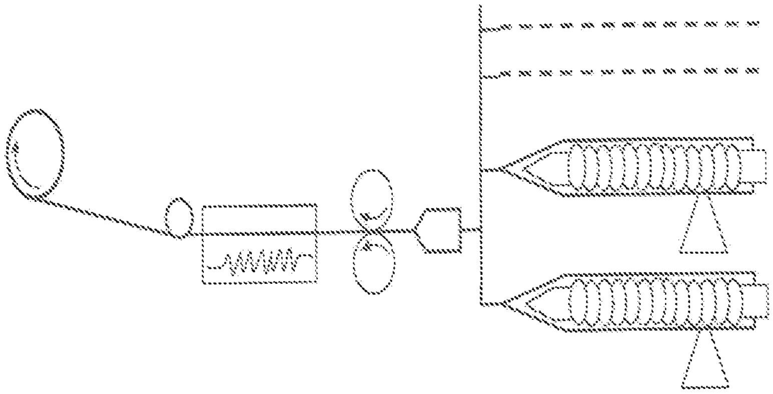
FIG. 2 is a schematic diagram of a two or multilayer extrusion stretching process according to another Example of the present invention.

The present invention is described in further detail in combination with various examples below, in which the raw material supplier of the bio-based elastomer material used is the Pebax or EMS, of Arkema, for example, its bio-based nylon elastomer material.

Examples 1~10

As shown in Table 1, the formula mixtures of Examples 1 to 10, with the melting point measured by thermal analysis instrument DSC, were directly made into a two-layer film by melt co-extrusion (see FIG. 2) with a processing temperature between 160° C. and 290° C. After surface processing, side cutting and bundling, a matte film of 20 μm in thickness was finally prepared at a production speed of 30 m/min. Formula 7 corresponded to a white matte film of 20 μm, and formulas 5, 6, 8 and 10 corresponded to fragrant matte white films of 20 μm. Specific performance tests are shown in Table 2. These Examples exhibited different melting points, in which the melting points of Examples 1-4 were lower than that of other Examples and that of Examples 5-7 were higher than that of Examples 8-10. Examples 1-2 showed that proper photothermal stabilizers improved thermal stability, toughness, etc. Compared with Example 3, Example 4 showed a significant increase on the moisture permeability, but a decrease both on the breaking elongation and on the elastic recovery. The appearance of Example 6 was significantly better than that of Example 5, and its breaking elongation rate was improved, but still much lower than that of other Examples with a better thermal stability and a decreased elastic recovery. The breaking elongation of Example 7 was close to normal, its thermal stability remains close to that of Example 6, its moisture permeability was higher than other Examples, and its elastic recovery decreased slightly. Examples 8-10 were fragrant films, and the addition of fragrant component(s) did not affect the moisture permeability of the product, but the elastic modulus increased slightly. Compared with Examples 8-9, due to the addition of the chain extender, the moisture permeability of Example 10 increased slightly, the breaking elongation increased, the elastic modulus increased slightly, and the thermal stability increased.

Examples 11~12

As shown in Table 1, the formula mixture of Example 7, with the melting point measured by thermal analysis instrument DSC, was first granulated, and then in Example 11 made into a two-layer film by melt co-extrusion (see FIG. 2) at processing temperature between 160° C. and 290° C. and in Example 12 made into a single-layer film by melt extrusion at processing temperature between 190° C. and 230° C. After surface processing, side cutting and bundling, a matte film of 20 μm in thickness was finally prepared at a production speed of 35 m/min. Specific performance tests are shown in Table 3 and compared with Example 7. Both the breaking elongation and the elastic recovery of Example 7 decreased as compared with Examples 11 and 12, indicating that the inorganic powder was well dispersed after granulation.

Examples 13~15

Figure 1:
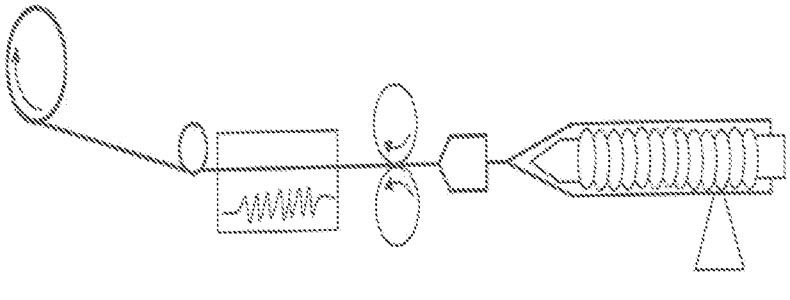
FIG. 1 is a schematic diagram of a single-layer extrusion stretching process according to an Example of the present invention.

As shown in Table 1, the formula mixture of Example 10, with the melting point measured by thermal analysis instrument DSC, was first granulated and then made into a single-layer film by melt extrusion (FIG. 1) with a processing temperature between 160° C. and 290° C. After surface processing, side cutting and bundling, a colorless matte film of 20 μm was finally prepared in Example 13, a light white film of 20 μm was finally prepared in Example 14 and a matte film of 5 μm was finally prepared in Example 15 at a production speed of 30 m/min. Specific performance tests are shown in Table 3. After comparison, the moisture permeability of Example 14<that of Example 13<that of 15, the breaking elongation of Example 14>that of Example 13>that of Example 15, and elastic recovery of Example 14>that of Example 13>that of Example 15.

Examples 16~17

As shown in Table 1, the formula mixture of Example 10, with the melting point measured by thermal analysis instrument DSC, was first granulated, and then made into a two-layer film by melt co-extrusion (see FIG. 2). In Example 16 the processing temperature was 160° C.-290° C., while in Example 17 the processing temperature was 200° C.-250° C. After surface processing, side cutting and bundling, a white matte film of 5 μm was finally prepared in Example 16 at a production speed of 40 m/min, and a white matte film of 8 μm was finally prepared in Example 17 at a production speed of 40 m/min. Specific performance tests are shown in Table 3. Compared with Example 15, the breaking elongation and elastic recovery decreased. In Example 17 the thickness increased significantly, its breaking elongation increased, and its moisture permeability decreased.

Examples 18~19

As shown in Table 1, the formula mixture of Example 1, with the melting point measured by a thermal analysis instrument DSC, was first granulated, and then in Example 18 made into a two-layer film by melt co-extrusion (see FIG. 2) at a production speed of 35 m/min and in Example 19 made into a three-layer film by melt co-extrusion at a production speed of 40 m/min. The processing temperature was between 160° C. and 290° C. After surface processing, side cutting and bundling, a colorless matte film of 20 μm in thickness was finally prepared. Specific performance tests are shown in Table 3. Compared with Example 1, it showed that the breaking elongation decreased slightly when the formula of Example 1 was granulated, but the film production speeds of Example 18 and Example 19 also had to be increased for obtaining a film with same thickness, and the film production speed of Example 18 was lower than that of Example 19.

Examples 20~23

As shown in Table 1, the formula mixture of Example 1, with the melting point measured by a thermal analysis instrument DSC, is directly made into a two-layer film by melt co-extrusion (see FIG. 2) with a processing temperature between 160° C. and 290° C. In Example 20 after surface processing, 130° C. high temperature ripening, side cutting and bundling, a matte film of 20 μm was finally prepared at a production speed of 30 m/min, which had high toughness, high moisture permeability and high elastic recovery. In Example 21 after surface processing, applying back adhesive, 130° C. high temperature ripening, side cutting and bundling, a matte film of 20 μm with high toughness was finally prepared at a production speed of 30 m/min, in which back adhesive was applied continuously with a solvent glue. In Example 22 the film production procedure was same with that of Example 20, but the production speed was 40 m/min. In Example 23 the film production procedure was same with that of Example 21, but back adhesive was applied in a dotted manner with a solvent glue. Specific performance tests are shown in Table 4. Compared with Example 1, the moisture permeability in Example 20 and 22 was significantly improved, and both the elastic recovery and the toughness were also enhanced a lot. The performance of Example 22 was slightly lower than that of Example 20, indicating that the production speed affected the performance resulted from the intermediate special process. Example 21 and 23 were back adhesive films, and the moisture permeability decreased significantly, and the hand feel stiffened significantly, especially in Example 21 in which the moisture permeability was almost disappeared.

TABLE 1

Formulas of Examples 1-23

| Formula, wt % | Example 1 | Example 2 | Example 3 | Example 4 | Example 5 | Example 6 | Example 7 | Example 8 | Example 9 | Example 10 |
|---|---|---|---|---|---|---|---|---|---|---|
| bio-based nylon elastomer material | 90 | 80 | 70 | 60 | 50 | 40 | 30 | 20 | 10 | 5 |
| resin polymer | 0 | 5 | 10 | 20 | 30 | 40 | 50 | 60 | 70 | 80 |
| inorganic powder material | 10 | 10 | 10 | 10 | 9 | 9 | 8 | 8 | 7 | 5 |

TABLE 1-continued

Formulas of Examples 1-23

| Formula, wt % | Example 1 | Example 2 | Example 3 | Example 4 | Example 5 | Example 6 | Example 7 | Example 8 | Example 9 | Example 10 |
|---|---|---|---|---|---|---|---|---|---|---|
| organic low molecular material | 0 | 5 | 10 | 10 | 11 | 11 | 12 | 12 | 13 | 10 |
| organic dispersant | 0.4 | 0.5 | 0.5 | 0.6 | 0.6 | 0.7 | 0.7 | 0.8 | 0.8 | 0.4 |
| Formula, wt % | Examples 11~12 | | Examples 13~15 | | Examples 16~17 | | Examples 18~19 | | Examples 20~23 | |
| bio-based nylon | same as Example 7 | | same as Example 10 | | same as Example 10 | | same as Example 1 | | same as Example 1 | |
| elastomer material | | | | | | | | | | |
| resin polymer | | | | | | | | | | |
| inorganic powder material | | | | | | | | | | |
| organic low molecular material | | | | | | | | | | |
| organic dispersant | | | | | | | | | | |

TABLE 2

Performances of Examples 1-10

| performance | unit | Example 1 | Example 2 | Example 3 | Example 4 | Example 5 | Example 6 | Example 7 | Example 8 | Example 9 | Example 10 |
|---|---|---|---|---|---|---|---|---|---|---|---|
| color | — | matte | matte | matte | matte | white matte | white matte | white matte | white matte | matte | white matte |
| thickness | μm | 20 | 20 | 20 | 20 | 20 | 20 | 20 | 20 | 20 | 20 |
| odour | — | — | — | — | — | fragrant | fragrant | — | fragrant | — | fragrant |
| melting point DSC | ° C. | 185 | 190 | 182 | 189 | 200 | 220 | 232 | 194 | 198 | 195 |
| thermal stability (173° C., 60 s) | % | +2 | +3 | +4 | +3 | +2 | +0 | +1 | +3 | +4 | +2 |
| moisture permeability JIS L1099 Bl | $g/m^2$ * 24 h | 109000 | 105000 | 100000 | 140000 | 110000 | 115000 | 145000 | 112000 | 106000 | 126000 |
| breaking elongation | % | 406 | 411 | 410 | 400 | 301 | 340 | 400 | 412 | 409 | 430 |
| elastic recovery | % | 45.6 | 46.2 | 46.7 | 46.2 | 46.1 | 45.0 | 46.7 | 46.3 | 46.2 | 45.8 |
| elastic modulus ASTM D828 (vertical/horizontal) | MPa | 90/100 | 70/80 | 82/95 | 100/110 | 119/125 | 110/120 | 100/110 | 95/105 | 100/115 | 110/125 |

TABLE 3

Performances of Examples 11-19

| performance | unit | Example 11 | Example 12 | Example 13 | Example 14 | Example 15 | Example 16 | Example 17 | Example 18 | Example 19 |
|---|---|---|---|---|---|---|---|---|---|---|
| color | — | matte | matte | colorless matte | glazing white | matte | white matte | white matte | colorless matte | colorless matte |
| thickness | μm | 20 | 20 | 20 | 20 | 5 | 5 | 8 | 20 | 20 |
| odor | — | — | — | — | — | — | — | — | — | — |
| melting point DSC | ° C. | 232 | 232 | 195 | 195 | 195 | 195 | 195 | 185 | 185 |
| thermal stability (173° C., 60 s) | % | +2 | +2 | +1 | +4 | +2 | +0 | +4 | +0 | +1 |
| moisture permeability JIS L1099 Bl | $g/m^2$*24 h | 150000 | 152000 | 155000 | 148000 | 160000 | 144000 | 134000 | 120000 | 125000 |
| breaking elongation | % | 422 | 430 | 440 | 460 | 431 | 400 | 420 | 399 | 400 |
| elastic recovery | % | 47.7 | 47.8 | 47.8 | 48.8 | 46.5 | 44.2 | 44.0 | 35.6 | 43.2 |
| elastic modulus ASTM D828 (vertical/horizontal) | MPa | 100/110 | 95/110 | 90/110 | 80/100 | 110/120 | 119/130 | 120/135 | 130/140 | 140/150 |

TABLE 4

Performances of Examples 20-23

| performance | unit | Example 20 | Example 21 | Example 22 | Example 23 |
| --- | --- | --- | --- | --- | --- |
| color | — | matte | matte | matte | matte |
| thickness | μm | 20 | 20 | 20 | 20 |
| odor | — | — | — | — | — |
| melting point DSC | ° C. | 185 | 185 | 185 | 185 |
| thermal stability (173° C., 60 s) | % | +2 | +0 | +3 | +0 |
| moisture permeability JIS L1099 B1 | g/m$^2$*24 h | 130000 | 1000 | 140000 | 80000 |
| breaking elongation | % | 420 | 220 | 430 | 300 |
| elastic recovery | % | 47.2 | 25.0 | 47.8 | 22.0 |
| elastic modulus ASTM D828 (vertical/horizontal) | MPa | 95/100 | 300/400 | 80/95 | 250/300 |

The invention claimed is:

1. A composition for preparing a bio-based elastomer film with a moisture permeability of 100,000 g/m$^2$*24 h or more, wherein the composition comprises:

5 wt % to 80 wt % bio-based nylon elastomer material, 5 wt % to 80 wt % polymer resin, 5 wt % to 10 wt % inorganic powder material with a particle diameter less than 100 μm, 5 wt % to 13 wt % organic low molecular material with a molecular weight less than 1000 Daltons selected from the group consisting of polyols and their derivatives, and polyfunctional organic molecules with active epoxy group and their derivatives in which the number of functional groups is 2-10, and 0.5 wt % to 0.8 wt % organic dispersant selected from the group consisting of fatty acid, aliphatic amide, and ester.

2. The composition according to claim 1, wherein the bio-based nylon elastomer material contains a proportion of bio-based components of 10-80 wt % measured according to ASTM D6866-2016.

3. The composition according to claim 1, wherein the polymer resin is one or more polymer selected from the group consisting of polyether, polyolefin, polyurethane, nylon, polyethylene terephthalate, polybutylene terephthalate, polyether ester and their derivatives.

4. The composition according to claim 1, wherein the inorganic powder material is one or more inorganic powder selected from the group consisting of titanium dioxide, silicon dioxide, montmorillonite, inorganic pigments, calcium carbonate, barium sulfate white, ceramic powder and magnesium hydroxide.

5. A bio-based elastomer film prepared from the composition according to claim 1 with a thickness of 2-150 μm, wherein said film is a co-extruded multi-layer structure or a single-layer structure, and wherein said film has a moisture permeability of 100,000 g/m$^2$*24 h or more measured according to JIS L1099 B1 method.

6. The bio-based elastomer film according to claim 5, wherein said film has a breaking elongation of greater than 300% and an elastic modulus of less than 500 MPa measured according to ASTM D828.

7. A laminate of thermoplastic resin film, wherein said laminate comprises at least one layer of the bio-based elastomer film according to claim 5, at least one layer of thermoplastic resin products, and an adhesive layer formed by a glue which is located between said layer of the bio-based elastomer film and said layer of the thermoplastic resin product, wherein said layer of the thermoplastic resin product is a thermoplastic resin film or a thermoplastic resin fiber product, which is textile fiber and/or non-woven fabric.

8. The laminate according to claim 7, wherein one or more layers of said textile fiber are fiber material selected from the group consisting of polyether ester and its derivatives, polyester and its derivatives, nylon and its derivatives, polyurethane and its derivatives, polypropylene and its derivatives, and any combination thereof, and wherein one or more layers of said non-woven fabric are selected from the group consisting of polyolefin and its derivatives, polyester and its derivatives, nylon and its derivatives, and biodegradable plant fiber and its derivatives.

9. The laminate according to claim 7, wherein the adhesive layer is a discontinuous layer.

10. The laminate according to claim 7, wherein the laminate has a moisture permeability of 25,000 g/m$^2$*24 h or more measured according to JIS L1099B1 method.

* * * * *